(12) United States Patent
Dickens

(10) Patent No.: US 6,264,734 B1
(45) Date of Patent: *Jul. 24, 2001

(54) METHOD FOR FORMING INSULATED PRODUCTS AND BUILDING PRODUCTS FORMED IN ACCORDANCE THEREWITH

(75) Inventor: Luther Dickens, Radford, VA (US)

(73) Assignee: RADVA Corporation, Radford, VA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/012,948

(22) Filed: Jan. 23, 1998

Related U.S. Application Data

(63) Continuation-in-part of application No. 08/821,094, filed on Mar. 20, 1997, now Pat. No. 5,749,960.

(51) Int. Cl.⁷ .................................................. C04B 14/04
(52) U.S. Cl. .............................. 106/600; 52/600; 52/602; 52/603
(58) Field of Search ................................. 106/600, 632; 252/62; 52/503, 504, 505, 506.01, 600, 602, 603, 606, 609, 611, 722.1, 737.6, 444; 264/333

(56) References Cited

U.S. PATENT DOCUMENTS

| 815,641 | * | 3/1906 | Schoeman . |
| 840,071 | * | 1/1907 | Lewis . |
| 995,008 | * | 6/1911 | Jackson . |
| 1,657,861 | * | 1/1928 | Lucas . |
| 1,842,828 | * | 1/1932 | Giuliani . |
| 2,438,528 | * | 3/1948 | Wilhelm et al. . |
| 3,012,525 | * | 12/1961 | Thomas . |
| 3,496,691 | * | 2/1970 | Seaburg et al. . |
| 3,669,299 | * | 6/1972 | Jones et al. . |
| 4,001,126 | * | 1/1977 | Marion et al. . |
| 4,069,283 | * | 1/1978 | Rauchfuss .............................. 264/32 |
| 4,110,499 | * | 8/1978 | Harrison . |
| 4,171,985 | * | 10/1979 | Motoki et al. . |
| 4,446,040 | * | 5/1984 | Samanta ................................. 252/62 |
| 4,462,835 | * | 7/1984 | Car . |
| 4,533,393 | * | 8/1985 | Neuschaeffer et al. . |
| 4,668,548 | * | 5/1987 | Lankard ................................. 428/63 |
| 4,680,059 | * | 7/1987 | Cook et al. ............................ 252/62 |
| 4,946,811 | * | 8/1990 | Tuovinen . |
| 4,984,401 | * | 1/1991 | Baldino ................................. 52/378 |
| 4,985,163 | * | 1/1991 | Kratel et al. ............................ 252/62 |

(List continued on next page.)

FOREIGN PATENT DOCUMENTS

2060239 * 5/1996 (RU) .

Primary Examiner—Paul Marcantoni
(74) Attorney, Agent, or Firm—McGuireWoods LLP

(57) ABSTRACT

A method for forming building products from heat insulated material and building products formed in accordance therewith includes providing a mold configured with inner dimensions equal to the desired configuration of the building material block; providing a fluid mixture of heat insulating material formed from a predetermined composition of ingredients; providing at least one rigid reinforcement member and placing the reinforcement member in the mold; introducing the fluid mixture into the mold with the at least one reinforcement member and allowing the fluid mixture to harden within the mold and removing the mixture from the mold resulting in a block of reinforced heat insulating building material. The present invention is also directed to a block of reinforced heat insulated building material according to the method.

24 Claims, 3 Drawing Sheets

U.S. PATENT DOCUMENTS

| | | | |
|---|---|---|---|
| 5,015,606 | * | 5/1991 | Lang et al. |
| 5,035,100 | * | 7/1991 | Sachs ................................... 52/741 |
| 5,048,250 | * | 9/1991 | Elias ................................... 52/437 |
| 5,066,440 | * | 11/1991 | Kennedy et al. ................. 264/69 |
| 5,312,806 | * | 5/1994 | Mogensen . |
| 5,482,904 | * | 1/1996 | Kawabe et al. ................... 252/62 |
| 5,520,729 | * | 5/1996 | Engert et al. .................... 106/601 |
| 5,556,689 | * | 9/1996 | Kratel et al. ..................... 428/137 |
| 5,566,521 | * | 10/1996 | Andrews et al. ................. 52/606 |
| 5,705,106 | * | 1/1998 | Kolesnikov et al. ............ 264/29.1 |
| 5,749,960 | * | 5/1998 | Belyayev ......................... 106/600 |
| 5,934,037 | * | 8/1999 | Bundra ............................. 52/603 |

* cited by examiner

METHOD FOR FORMING INSULATED PRODUCTS AND BUILDING PRODUCTS FORMED IN ACCORDANCE THEREWITH

CROSS REFERENCE TO RELATED APPLICATIONS

The present application is a continuation-in-part of Ser. No. 08/821,094 filed on Mar. 20, 1997, FORMULATION FOR PRODUCING HEAT INSULATING MATERIAL AND METHOD FOR PRODUCING THE SAME, which issued as U.S. Pat. No. 5,749,960 on May 12, 1998.

BACKGROUND OF THE INVENTION

The present application relates broadly to heat insulating materials and, more precisely, to building products, especially those produced according to a formulation that produces a heat insulating material that can withstand a broad range of temperatures and which is formed through an exothermic reaction that is initiated at normal room temperature conditions or at lower, even cold, temperatures without requiring a heating source.

There are certain known means for producing heat insulating materials for a variety of purposes or equipment, each usually requiring some external heat source. The resulting heat insulating material is therefore not formed during normal room environmental conditions, which can make the production of heat insulating material in large-dimensional constructed forms difficult and expensive due to energy and control requirements. Additionally, the currently known heat insulating materials often do not have a resistance to heat that exceeds 900° C., which consequently narrows the potential range of their application. In addition, it may become desirable to form building materials at a construction site or "in the field." This is a virtual impossibility with materials requiring an external heat source.

For another example, U.S. Pat. No. 4,110,499 discloses a heat protective material that requires the material to be subjected to temperatures in the range of 2000° F. to 2500° F. in order to obtain maximum strength. U.S. Pat. No. 5,015,606 discloses a lightweight ceramic material for building purposes that is produced by firing a foamed mixture at temperatures above 600° C. Further, U.S. Pat. No. 5,312,806 discloses mineral fibers that are for use in thermal insulation, which is made through a process that requires a coke-heated cupola furnace that operates at temperatures in the range of 1565° C. to 1605° C. When the production of heat insulating material requires the use of an external heat source, the process for such production leads to a significant increase in the heat insulating material's costs.

Moreover, there are currently known heat insulating materials that use iron silicon and which may need to have heat firing during the production of the heat insulation materials. For example, a known method for making highly porous items for heat insulating equipment, consists of the use of a mixture into which a finely milled metallic silicon or iron silicon is introduced with a finely dispersed material, such as diatomite, trepel or marshalite. A liquid glass, or, as is known, a water glass, is then added in the amount necessary for turning the mixture into a thick creamy consistency. The mixture is then thoroughly mixed and heated, causing the iron silicon or silicon to react in the alkaline medium of liquid glass.

For another example, U.S. Pat. No. 4,171,985 discloses the use of iron silicon with water glass in the temperature range from 5° to 90° C. in which the unaided reaction may take 24 hours to come to completion, so that heating to 90° C. is suggested "as a matter of course." The problem with this above-described process is that the chemical reaction which produces the heat insulating material either does not start at all without heating or requires a long time to come to completion without heating. Additionally, when heat is required for the chemical reaction, the hardening of the mixture occurs during post-reaction cooling. This limits the applicability of such a mixture or process in large-dimensioned constructed forms because of associated dimensional changes. Further, the process described in the 985 Patent requires the use of the water-soluble alkali silicate, alumina cement, a metal base foaming agent and a foam stabilizing agent to produce its heat insulating material. The use of these four elements limit the applicability of the heat insulating material production during field conditions and in construction forms of large dimensions that do not have an external heat source.

In order to overcome the above-mentioned defects in the previously mentioned heat insulating building materials, there is a need for specific building materials formed from a formulation for heat insulating material and a method for making the same that includes a self-starting chemical reaction that leads to a dimensionally stable, structurally strong product and which initiates at normal room or lower temperatures which eliminates the need for external heating or firing. Further, there is a need for building materials formed from a heat insulating material with a relatively low density with increased the hardness characteristics. Additionally, there is a need for such building materials formed from heat insulating material that provided lower material costs and provides building material possessing adhesive and cohesive properties. Furthermore, there is a need for building materials formed from heat resistant and heat insulating materials with dielectric properties that work in conditions of normal, low and high temperatures.

SUMMARY OF THE INVENTION

It is accordingly an object of the present invention to provide building materials formed from heat insulating material with a relatively low density yet with increased hardness characteristics.

Further, it is an other object of the present invention to provide such building materials formed from the heat insulating material that provides lower material costs and provides adhesive and cohesive properties.

It is another object of the present invention to provide such building materials formed from heat resistance and heat insulating materials with dielectric properties that work in conditions of normal, low and high temperatures.

To those ends, a method for making a heat insulated reinforced block of building material includes providing a mold configured with inner dimensions equal to a desired configuration of the block of building material, providing a fluid mixture of heat insulating material formed from a predetermined composition of ingredients; providing at least one rigid reinforcement member; placing the at least one reinforcement member in the mold; introducing the fluid mixture into the mold with the at least one reinforcement member; allowing the fluid mixture to harden within the mold and removing the mixture from the mold, resulting in a block of reinforced heat insulated building material.

It is preferred that the step providing a fluid mixture of heat insulating material includes providing the fluid mixture of heat insulating material formed from a composition of the following ingredients and the following amounts:

| | |
|---|---|
| Water Glass | 32–52% by weight |
| Sodium Hydroxide | 3–4% by weight |
| Filler | 25–36% by weight |
| Iron Silicon | 20–22% by weight |

Preferably, the step placing the at least one reinforcement member in the mold includes placing the reinforcement member in the mold in a disposition where in at least a portion of the reinforcement member forms at least a portion of an outer surface of the block of building material and extends longitudinally along the block.

It is further preferred that the step of providing at least one rigid reinforcement member includes providing a plurality of reinforcement members and the step of placing at least one reinforcement member in the mold includes placing a predetermined number of reinforcement members in the mold with at least a portion of the predetermined number of reinforcement members forming at least a portion of an outer surface of the block. It is preferred that the step of providing a fluid mixture of heat insulating material includes providing heat insulating material formed with the ingredients at temperatures in the range between room temperature and approximately minus 10° C. Preferably, the step of providing heat insulating material includes providing heat insulating material as formed through an exothermic reaction that produces a formulation that hardens without the use of an external energy source. It is further preferred that the step of providing a fluid mixture of heat insulating material includes providing a filler formed from firing clay. Preferably the step of providing a fluid mixture of heat insulating material includes providing water glass having a $SiO_2/Na_2$ ratio (modulus) that is within the approximate range 2.4 to 3.0 with a density of approximately 1.41 to 1.47 $gm/cm^3$. The step of providing a fluid mixture of heat insulating material also may include providing water glass formed from sodium silicate.

In another preferred embodiment of the present invention the method includes the steps of providing a mold configured with inner dimensions equal to a desired configuration of the block of building material; providing a plurality of hardened structures of heat insulating material formed from a predetermined composition of ingredients; providing at least one rigid reinforcement member; providing a fluid mixture of heat insulating material formed from the predetermined composition of ingredients; placing the hardened structures and the at least one reinforcement member in the mold with the at least one reinforcement member being disposed between the hardened structures; introducing the fluid mixture into the mold to surround the hardened structures and the at least one reinforcement member allowing the fluid material to harden within the mold and removing the mixture from the mold, resulting in a block of reinforced heat insulating building material. Preferably, the steps of providing a plurality of hardened structures of heat insulating material and providing a fluid mixture of heat insulating material including providing both the hardened structures and the fluid mixture formed from a composition of ingredients as described above. It is further preferred that a plurality of reinforcement members are provided and the step of placing the hardened structures and the at least one reinforcement member in the mold includes placing the hardened structures and the reinforcement members in alternating layers within the mold. It is further preferred that the step of providing at least one reinforcement member includes providing the at least one reinforcement member formed as a generally elongate steel channel. Further, the step of placing at least one reinforcement member in the mold includes placing the reinforcement member in the mold in a disposition where in at least a portion of the reinforcement member forms at least a portion of an outer surface of the block of building material. It is preferred that the step of placing at least one reinforcement member in the mold includes placing the reinforcement member in the mold at a disposition extending longitudinally along the block. It is also preferred that the step of placing the at least one reinforcement member in the mold includes placing the reinforcement member in the mold at a disposition extending width-wise across the block.

According to another preferred embodiment of the present invention, the method includes the steps of providing a mold configured with inner dimensions equal to a desired configuration of the block of building materials; providing a fluid mixture of heat insulating material formed from a predetermined composition of ingredients, providing a plurality of rigid reinforcement members; placing the predetermined number of reinforcement members in the mold, with the predetermined number reinforcement members forming at least a portion of first surface of the blocks; introducing the fluid mixture into the mold with a predetermined number of reinforcement members; allowing the fluid material to harden within the mold; and removing the mixture from the mold, resulting in a block of reinforced heat insulating building material. Preferably the step of providing a fluid mixture includes providing a fluid mixture of heat insulating material formed from a composition of ingredients as described above. Further, the present invention preferably includes the step of placing a second predetermined number of reinforced members in the mold, on the fluid mixture prior to hardening thereof at a disposition where in at least a portion of the second predetermined number of reinforcement members forms at least a portion of the second outer surface of the block.

The present invention is also directed to a heat insulated, reinforced block of building material formed from the above-discussed methods. The block of building material includes a molded polygonal unit having a predetermined volume and being formed from a hardened fluid mixture of heat insulating material, the fluid mixture of heat insulating material being formed from a predetermined composition of ingredients, the unit having at least one reinforcement member disposed at least partially internally thereof. Preferably, the fluid mixture of heat insulating material is formed from a composition of ingredients as described above. The building material according to the present invention preferably further includes a plurality of hardened structures of heat insulating material formed from the predetermined composition of ingredients and disposed internally within the block with at least one reinforcement member disposed intermediate at least two of the hardened structures. It is preferred that the hardened structures are formed from a composition of ingredients as described above. It is further preferred that the at least one reinforcement member be formed from steel. Preferably, the at least one reinforcement member is disposed internally within the unit and extends width-wise thereof. It is alternately preferred that the unit include a plurality of reinforcement members extending longitudinally along the block and at least a portion of the reinforcement members forms at least a portion of an outer wall of the block.

It is preferred that the heat insulating material be formed through an exothermic reaction that produces a formulation that hardens without the use of an external energy source. Further, the filler is preferably formed of firing clay. It is further preferred that the water glass have an $SiO_2/Na_2O$ ratio (modulus) that is within the approximately range 2.4 to 3.0 with a density of approximately 1.41 to 1.47 gm/cm$^3$. Preferably, the water glass is sodium silicon.

By the above, the present invention provides a method for producing a block of reinforced building material formed from low density heat insulating material and building products produced according to the method.

DESCRIPTION OF THE PREFERRED EMBODIMENTS

Figure 1:
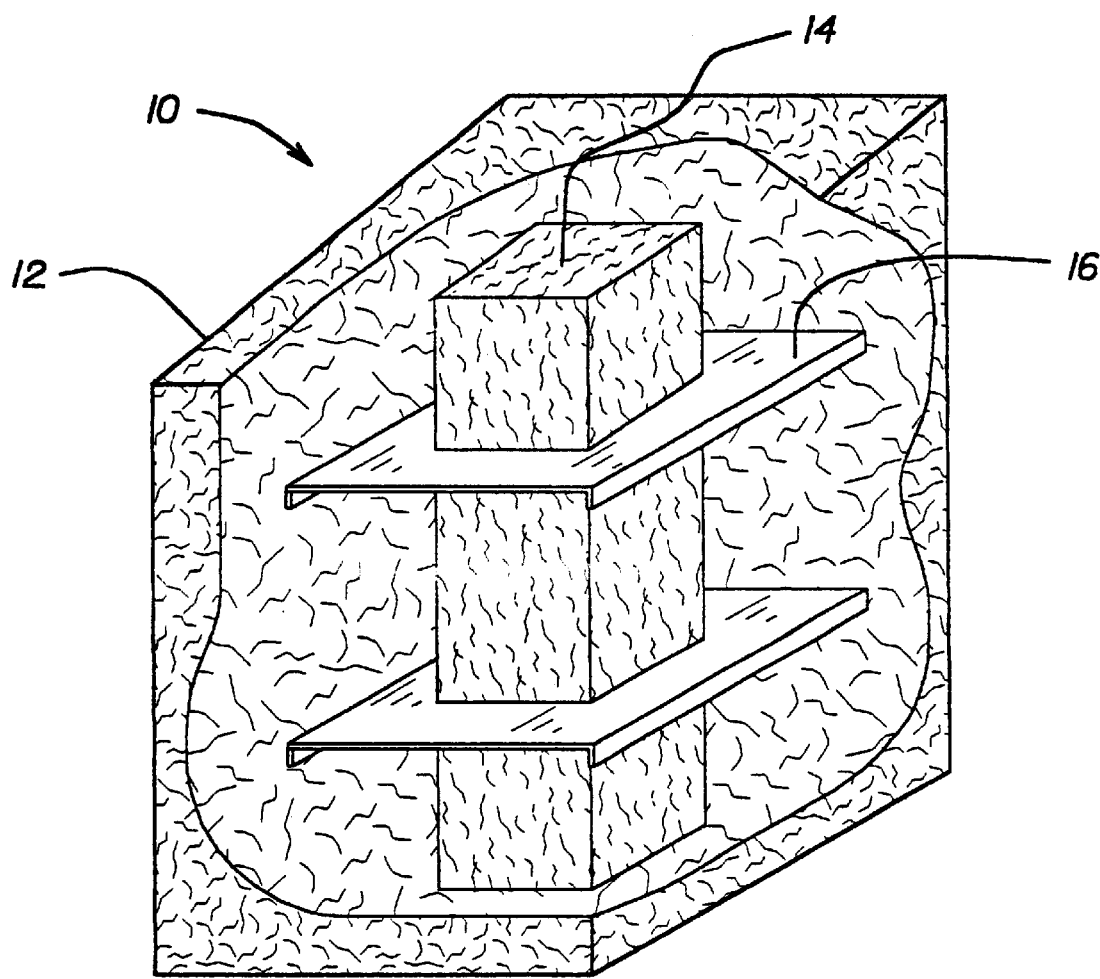
FIG. 1 is a perspective view of a heat insulated reinforced block of building material according to one preferred embodiment of the present invention, broken open to reveal the internal structure thereof.

Turning now to the drawings and, more particularly to FIG. 1, the first preferred embodiment of the present invention is illustrated as a heat insulated reinforced block of building material broken open to reveal the inner structure thereof and is illustrated generally at 10. The present invention includes a method for forming the block as well as at least one more embodiment thereof. FIG. 1 reveals the block 10 to include a solid body 12 formed from heat insulating material which will be described in greater detail hereinafter. Within the body 12, a stack of hardened structures 14 are provided in alternating layers with elongate steel channels 16 which provide reinforcement of the block 10. The hardened structures 14 are formed generally as cubes and are made from the same heat insulating material as is the body 12 of the block 10. It should be noted that while cubes are illustrated, the hardened structures 14 maybe formed as cylinders or any other geometric structure that will provide positioning for the steel reinforcement member 16 during the molding process. Once the block is molded, the hardened structures 14 become substantially integral with the body 12 of the block 10. The reinforcement members 16 will provide the relatively light block with the ability to withstand crushing forces and should therefor be disposed in a generally parallel relationship with the outer surfaces of the block so that the block may be oriented with the reinforcement members running along the direction of compression when the blocks are in use.

Figure 3:
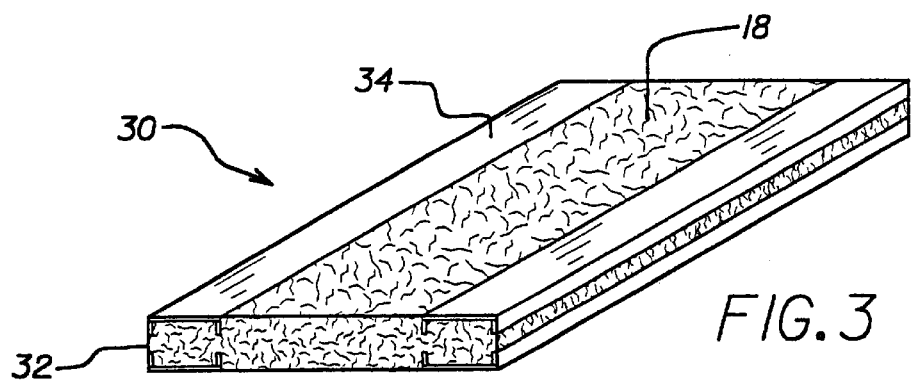
FIG. 3 is a perspective view of a heat insulated reinforced block of building material according to a second preferred embodiment thereof.

The second preferred embodiment of the present invention is illustrated in FIG. 3. There, the block 30 is formed as a generally elongate, relatively flat wall panel 32 formed from the heat insulating material 18 and includes four elongate steel channels 34 disposed at four corners thereof with an outer surface of the steel channels 34 forming a portion of the outer surface of the wall panel 30. Since the hardened heat insulating material 18 is relatively brittle and is formed with numerous pores which provide a rough surface, the smooth outer surface of the steel channels 34 provides the wall panel 30 with a mounting surface which will support screws, other fasteners or other attachments in general.

Figure 2:
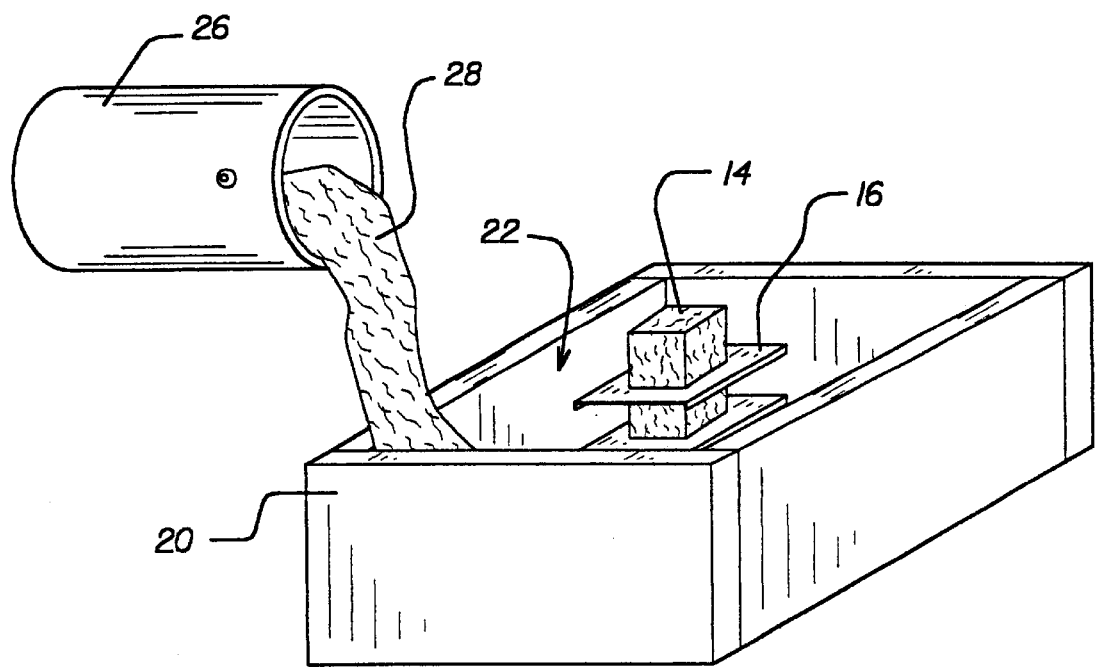
FIG. 2 is a perspective view of a mold receiving heat insulated material according to the method of the present invention.
Figure 4:
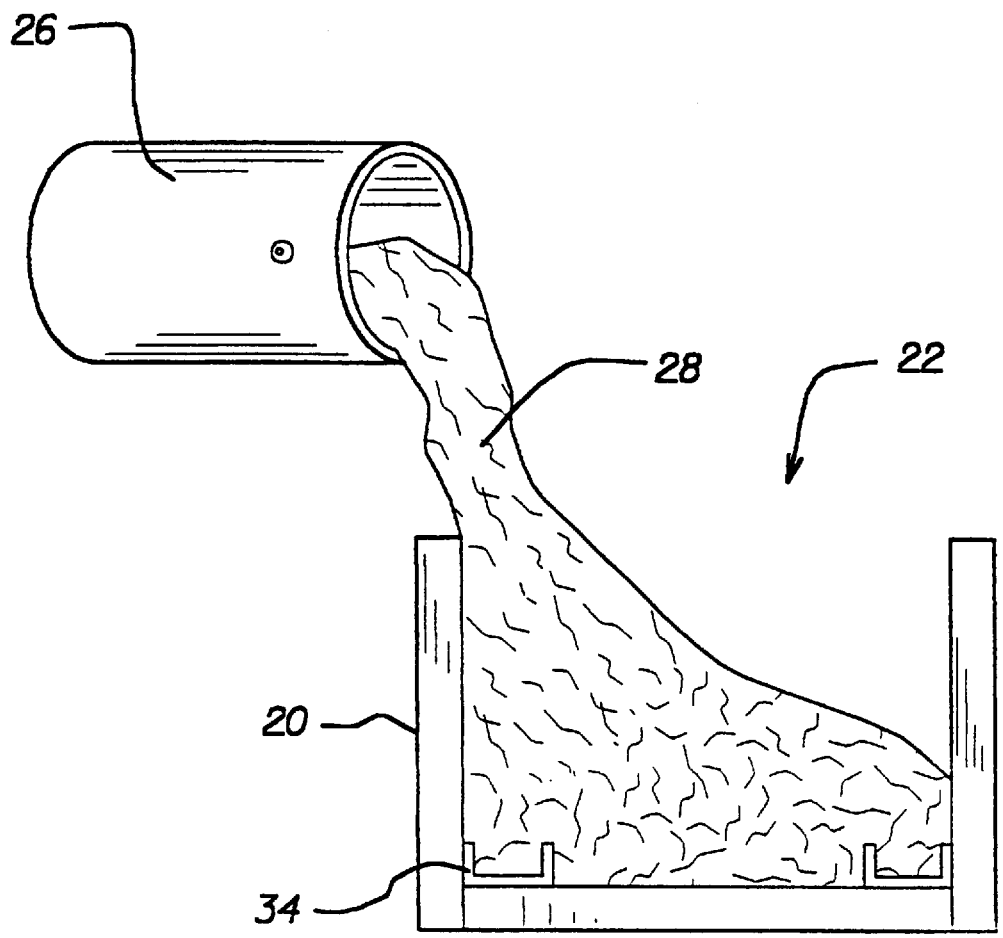
FIG. 4 is a cross sectional view of a mold receiving heat insulated building material according to a second preferred embodiment of the present invention.

Both of the preferred embodiments of the present invention are formed according to the method of the present invention and require a formulation of heat insulating material for molding as seen in FIGS. 2 and 4.

According to the formulation for producing a heat insulating material and the method for making such material, the heat insulating material is made by mixing an iron/silicon alloy with water glass (sodium silicate, which is the same as "liquid glass"), thereby providing the water necessary for the reaction. The reaction follows a path similar to that of the well-known alkaline corrosion of iron in water to produce hydrated ferric oxide and hydrogen. The evolution of water resulting from the solvent evaporation aids in the formation of material with structural integrity.

Additionally, firing clay can act as a binder, which, together with dehydrated sodium silicate, forms a typical two or three dimensional matrix of $SiO_3$ tetrahedra, which likely contributes to the physical strength of the building products made from the heat insulating material. The key is in the initial reaction of iron/silicon alloy with water in an alkaline medium. The reaction initiation is spontaneous and immediate when the ingredients are mixed and the reaction is completed in a relatively short time. In addition, the heat insulating material utilized in the present invention is stable when exposed to high temperatures and is based on inorganic materials. Further, the heat insulating material is made from a formulation that uses sodium silicate and produces a foam without the use of either an anionic surfactant, chromium or aluminum. Finally, the heat insulating material does not require the use of high temperature firing or pressure molding.

The formulation involves an exothermic reaction which depends on sodium silicate or liquid glass, sodium hydroxide, iron silicon and a filler, such as the aforesaid firing clay. More specifically, iron silicon reacts in an exothermic reaction in an alkaline medium resulting in a rapid release of energy in the form of heat. As a result of the exothermic reaction, the mixed formulation self-heats to temperatures near 100° C. The formulation becomes porous as a result of the formation of water vapor and hydrogen, and hardens as a result of water loss. Pore formation results in an increase of many times the volume and lowers the density of the resulting heat insulating material and, consequently, the weight of building materials formed from the material. The loss of water, in addition to contributing to pore formation, also leads to an increase in the dielectric qualities of the material. Additionally, the reaction of the iron component in iron silicon contributes to the heat resistance of the resulting heat insulating material.

The presence of sodium hydroxide is necessary for the reaction of the formulation that results in the heat insulating material and makes it possible for the reaction to occur at normal room temperature or at temperatures down to −10° C. Sodium hydroxide contributes to the speed with which the reaction occurs, thus insuring an adequate temperature rise and the evolution of water which results in pore formation. The increased temperature also facilitates water loss, thus contributing to the hardening of the heat insulating material.

The firing clay in the formulation provides for the necessary viscosity of the initial mixture, and contributes to the heat resistance of the heat insulating material. Other materials, such as kaolin or other finely dispersed powders, which perform analogous functions in providing viscosity and heat resistance, may be used instead of firing clay.

The ratio of $SiO_2$ to $Na_2O$ (modulus) for the sodium silicate or liquid glass is in the approximate range of 2.4 to 3.0, given the density of 1.41 to 1.47 g/cm$^3$. The values of the dispersion of the iron silicon are determined by the specific area of 0.004 to 0.005 cm$^2$/g, which allows for varying the viscosity of the formulation and its reactivity.

In general, the formulation for producing the heat insulating material having the qualities described above is prepared using the following basic steps:

(a) Granules of sodium hydroxide are added to the liquid glass and the solution is agitated to ensure complete dissolution. The iron silicon and the firing clay are added.

(b) The mixture is again agitated until a homogeneous plastic consistency is achieved and is then poured into a form or mold, as will be described in greater detail hereinafter.

(c) The resulting heat insulating material expands and hardens under normal conditions within 1 to 1.5 hours, substantially filling up the volume of the form or mold.

Further, in the process of hardening, hydrogen is produced, and during the final stage of hardening, water vapor is evolved as the product temperature rises to near 100° C. as a result of the reaction exothermicity.

In Table 1 shown below, examples of different fillers/binders are identified for use in the proposed formulation of the present invention in which part of the firing clay is replaced with the proposed filler. In this manner, the proposed formulation may be used with various fillers as a means for producing materials having the desired physical-mechanical properties.

TABLE 1

| Compound - Binder | Component Mass % |
|---|---|
| Liquid Glass | ~52 |
| Sodium Hydroxide | 4 |
| Firing Clay | 16 |
| Iron Silicon | 28 |

| | Filler/Binder = 3/1 | |
|---|---|---|
| Parameter | Sand/Binder | Ceramic/Binder |
| Density - Kg/m$^3$ | 1750 | 760 |
| Limit of Hardness under Compression - MGa | 37.4 | 5.32 |
| Heat Transfer Coefficient - Wt/m. ° C. | 0.85 | 0.54 |
| Time of Hardening - Min. | 120 | 120 |
| Working Temperature Range - ° C. | 1400 | 1100 |

The possible reactions in the formulation of the present invention for the heat insulating material are:

1. $Fe+2H_2O \rightarrow Fe(OH)_2+H_2$ (alkaline medium)
2. $2Fe(OH)_2+O_2(air)+xH_2O \rightarrow Fe_2O_3 \cdot (x+2)H_2O$ Reactions 1 and 2 represent a normal oxidation process which will be more rapid in the presence of finely divided iron. The reaction is exothermic. Mixing FeSi with a few drops of 0.5M NaOH produces rapid warming, indicating that reaction 1 is indeed proceeding. Since the entire process is carried out "in the open", air is surely present to supply oxygen for reaction 2. The expected water of hydration will be lost as the temperature of the mixture increases.

3. $2FeSi+3O_2 \rightarrow 2FeSiO_3$

Reaction 3 is one of the possible reactions in slag formation and may indeed occur here. Normally one would expect this silicate formation to occur at higher temperatures such as might be found in steel making ovens. The extent to which this reaction occurs will reduce the observed weight loss in the thermo-gravimetric analysis by reducing the extent of involvement of reaction 1 and by adding weight through oxygen incorporation. It is unlikely that reaction 3 occurs to any significant extent given the weight loss result reported below.

4. $Si+H_2O+2NaOH \rightarrow Na_2SiO_3+2H_2$

Reaction 4 is also exothermic and releases hydrogen gas.

Isothermal (28° C.) thermo-gravimetric analysis of the entire system as supplied, resulted in a weight loss of 13.9%. The sodium silicate used is a 42° Beaumé product containing 29.6% $SiO_2$, and 9.20% $Na_2O$ and therefore 61.2% water. On total material composition, this amounts to 23.2% water. Taking the composition of FeSi into account (approximately 25% Fe and 75% Si), the weight loss due to hydrogen evolution (reaction 1) is expected to be 0.27%. The weight gain due to oxidation (reactions 1 plus 2) amounts to 3.7%. Thus, the theoretical weight loss is expected to be 19.8%. In a second thermo-gravimetric analysis performed on the reaction product and carried out in stepped temperature mode, an additional weight loss of 4.9% on total reaction charge was measured giving a total weight loss of 18.8%, which compares reasonably with the theoretical.

In summary, the formulation for producing a heat insulating material has a self-starting exothermic chemical reaction which hardens the heat insulating material. The chemical reaction can occur in the temperature range between normal room temperatures and 10° C., and does not require an external heat source. The percentages of the components of the formulation are:

| | |
|---|---|
| Water Glass | 32–52% by weight |
| Sodium Hydroxide | 3–4% by weight |
| Firing Clay | 25–36% by weight |
| Iron Silicon | 20–22% by weight |

Returning now to FIG. 2, the reinforced block of building material according to one preferred embodiment of the present invention is formed according to the method of the present invention using the formulation previously described. First, the internal structure is formed which may be seen in FIGS. 1 and 2. As also previously described, a preformed mold (not shown) is used to form a plurality of cubes of the heat insulating material. The cubes are allowed to harden and are then arranged within the mold. A first cube is placed in the mold and a steel channel is placed on top of the cube. The cubes in the channel are placed within the mold in an alternating manner to arrive at the stack illustrated in FIGS. 1 and 2.

Figure 5:
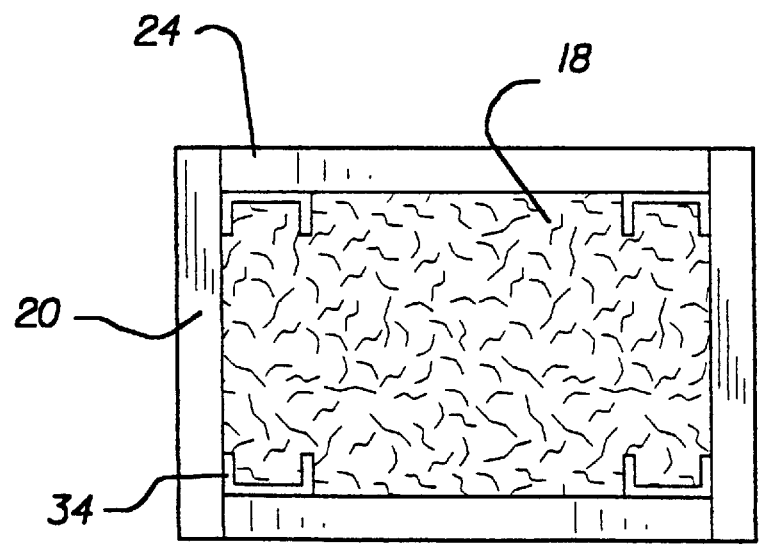
FIG. 5 is a cross sectional view of a mold filled with heat insulating material including reinforcement members according to the method of the present invention.

The mold 20 is formed from wood or other material to define a mold interior 22 for receiving the stack of hardened structures 14 and steel channel 16. The mold is preferably rectangular but is not limited to a rectangular configuration. Nevertheless, the regular shape offered by a rectangular mold lends itself well to producing blocks of building material. The heat insulating material 28 if formed according to the formulation described above and is poured from a vessel 26 or otherwise introduced into the interior 22 of the mold 20 to completely fill the mold. As seen in FIG. 5, a top portion 24 is placed on the upper surface of the insulating material 28 to define a six-sided structure once the mold is removed. It should be noted that while the insulating material 28 is shown being poured from a bucket 26, this technique is generally performed at a building site and the mass production of blocks according to the present invention will likely progress with the heat insulating material 28 flowing from a piping system or other delivery system. Therefore, it should not be presumed under any conditions that the heat insulating material 28 must be poured into the mold 20. In any event, the heat insulating material 28 is allowed to harden and the mold is broken away from the structure formed therein which provides the block 10 as illustrated in FIG. 1.

According to another preferred embodiment of the present invention, and with reference to FIG. 4, two steel channels 34 are placed in the bottom of the mold and the heat insulating material 28 is introduced into the interior 22 of the mold as previously described. With reference to FIG. 5, once the mold 20 has been filled with heat insulating material 28, two more steel channels 34 are disposed at upper surface of the heat insulating material 28. As seen in FIG. 5, a top 24 is placed on the steel channels 34 and the flowable heat insulating material 28 is allowed to harden into a hardened heat insulating material 18 as described in the discussion of the formulation. It will be apparent that those skilled in the art that the amount of heat insulating material introduced into the mold 28 must be regulated as the material expands when it cools. Trial and error or sophisticated density/volume calculations can provide the necessary amount of flowable material that will fill up the mold. Further, it is contemplated if the blocks are produced in great numbers, a computer may be employed to feed heat insulating material into the mold 20 in metered amounts sufficient to provide the necessary structure while not overfilling the mold. Once the heat insulating material 18 has hardened, the mold may be removed from around the block 10 and the block 10 then used for building material.

Blocks according to the present invention have many uses and can form mold structures to provide light, heat insulated and heat resistant walls for a building. Further, interior wall panels may be placed over the outer steel channels of the blocks illustrated in FIG. 3. Therefore, the present invention provides a lightweight, strong material for construction purposes.

It will therefore be readily understood by those persons skilled in the art that the present invention is susceptible of a broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A heat insulated, reinforced block of building material comprising:

a molded body defining a volume and being formed from a hardened fluid mixture of heat insulating material, said fluid mixture of heat insulating material being formed from a composition of ingredients;

at least one reinforcement member disposed in the volume of the body, the reinforcement member being an elongate channel including a center portion having sides and two side portions, each of the side portions connected to the respective sides of the center portion, said elongate channel being filled by said hardened fluid mixture of heat insulating material;

wherein at least a portion of each of the reinforcement members is enclosed by the molded body.

2. A heat insulated, reinforced block of building material according to claim 1 wherein said fluid mixture of heat insulating material is formed from a composition of the following ingredients, in the following amounts:

| a.) water glass | 32–52% by weight |
|---|---|
| b.) sodium hydroxide | 3–4% by weight |
| c.) filler | 25–36% by weight |
| d.) iron silicon | 20–22% by weight. |

3. A heat insulated, reinforced block of building material according to claim 1 and further comprising a plurality of hardened structures of heat insulating material formed from the same composition of ingredients as the molded body, each of the plurality of hardened structures disposed internally within said volume of the molded body, at least one of said at least one reinforcement member disposed between at least two of said hardened structures.

4. A heat insulated, reinforced block of building material according to claim 3 wherein said hardened structures of heat insulating material are formed from a composition of the following ingredients, in the following amounts:

| a.) water glass | 32–52% by weight |
|---|---|
| b.) sodium hydroxide | 3–4% by weight |
| c.) filler | 25–36% by weight |
| d.) iron silicon | 20–22% by weight. |

5. A heat insulated, reinforced block of building material according to claim 1 wherein said at least one reinforcement member is formed from steel.

6. A heat insulated, reinforced block of building material according to claim 1 wherein at least one of said at least one reinforcement member is entirely enclosed within said molded body and extends widthwise of the molded body.

7. A heat insulated, reinforced block of building material according to claim 1 including a plurality of reinforcement members, each of the reinforcement members extending longitudinally along said block and at least a portion of at least one reinforcement member forming at least a portio an outer wall of said block.

8. A heat insulated, reinforced block of building material according to claim 1 wherein said heat insulating material is formed through an exothermic reaction that produces a formulation that hardens without the use of an external energy source.

9. A heat insulated, reinforced block of building material according to claim 2 wherein said filler is formed of firing clay.

10. A heat insulated, reinforced block of building material according to claim 2, wherein said water glass has a $SiO_2/Na_2O$ ratio (modulus) that is within the approximate range 2.4 to 3.0 with a density of approximately 1.41 to 1.47 gm/cm$^3$.

11. A heat insulated, reinforced block of building material according to claim 2 wherein said water glass is sodium silicate.

12. A heat insulated, reinforced block of building material according to claim 1 wherein said fluid mixture of heat insulating material is formed from a composition of water glass, sodium hydroxide, filler, and iron silicon.

13. A heat insulated, reinforced block of building material according to claim 3 wherein said at least one reinforcement member disposed between at least two of said hardened structures is in physical contact with at least one of the hardened structures.

14. A heat insulated, reinforced block of building material according to claim 13 wherein said at least one reinforcement member disposed between at least two of said hardened structures is in physical contact with two of the hardened structures.

15. A heat insulated, reinforced block of building material according to claim 13 wherein said at least one reinforcement member disposed between at least two of said hardened structures is entirely enclosed within said molded body.

16. A heat insulated, reinforced block of building material according to claim 7 wherein the at least a portion of the at least one reinforcement member forming at least a portion of an outer wall of said block includes the center portion of the respective reinforcement member.

17. A heat insulated, reinforced block of building material according to claim 16 wherein the at least a portion of the at least one reinforcement member forming at least a portion of an outer wall of said block includes one side portion of the respective reinforcement member.

18. A heat insulated, reinforced block of building material according to claim 17 wherein the side portion of each respective reinforcement member not forming an outer wall of said block is substantially enclosed by the molded body.

19. A heat insulated, reinforced block of building material according to claim 3, wherein at least one of the plurality of hardened structures is in the shape of a cube.

20. A heat insulated, reinforced block of building material according to claim 3, wherein at least one of the plurality of hardened structures is in the shape of a cylinder.

21. A heat insulated, reinforced block of building material comprising:

a molded body defining a volume and being formed from a hardened fluid mixture of heat insulating material, said fluid mixture of heat insulating material being formed from a composition of the following ingredients in approximately these proportions:

| | |
|---|---|
| a.) water glass | 32–52%, |
| b.) sodium hydroxide | 3–4%, |
| c.) filler | 25–36%, |
| d.) iron silicon | 20–22%; | at least one reinforcement member disposed in the volume of the body, the reinforcement member being an elongate channel including a center portion having sides and two side portions, each of the side portions connected to the respective sides of the center portion, said elongate channel being filled by said hardened fluid mixture of heat insulating material;

wherein at least a portion of each of the reinforcement members is enclosed by the molded body.

22. A heat insulated, reinforced block of building material according to claim 21 wherein said filler ingredient is a firing clay.

23. A heat insulated, reinforced block of building material according to claim 21 wherein said water glass ingredient has a $SiO_2/Na_2O$ (modulus) that is within the approximate range 2.4 to 3.0 with a density of approximately 1.41 to 1.47 gm/cm$^3$.

24. A heat insulated, reinforced block of building material according to claim 21 wherein said at least one reinforcing member is positioned wherein at least a portion of said reinforcement member forms at least a portion of an outer surface of said block of building material and extends longitudinally along said block.

* * * * *